May 5, 1959

G. L. CLAPPER 2,885,573

TRANSISTOR DELAY CIRCUIT

Filed Sept. 4, 1956

INVENTOR
GENUNG L. CLAPPER

BY
Dewey J. Cunningham
ATTORNEY

United States Patent Office 2,885,573

Patented May 5, 1959

2,885,573

TRANSISTOR DELAY CIRCUIT

Genung L. Clapper, Vestal, N.Y., assignor to International Business Machines Corporation, New York, N.Y., a corporation of New York Application September 4, 1956, Serial No. 607,665

3 Claims. (Cl. 307—88.5)

This invention relates to signal translating apparatus, and particularly to an arrangement for producing an output signal which is delayed for a predetermined interval from an input signal.

In digital computer apparatus, there is often the requirement of introducing a delay in the occurrence of a signal. For example, where an adder is performing serial addition, it is necessary to delay the "carry" output from the adder for one digit time and supply it back as an input to the adder as the "previous-carry." A device for performing this operation is often referred to as a one-bit delay. Also, as signals are progressing through the various sections of a digital computer, they are often inadvertently delayed by line capacity, or other inherent characteristics, to the point where they are no longer in synchronism wtih the basic sync or clock pulse of the machine. Thus, it is necessary to delay the signal and synchronize it with the following clock pulse. In addition, there is the requirement in digital computers of entering information into bistable devices such as triggers, shift registers, and other similar devices.

Accordingly, the present invention relates to a signal translating apparatus comprising first and second transistors which are connected in serial relationship between two different D.C. voltage levels. First means are connected to the first transistor for biasing the first transistor for nonconduction in response to a signal supplied thereto at a time determined by a basic sync pulse. The second transistor is placed in a nonconductive state when the first transistor goes into a nonconductive state due to the fact that the first transistor forms a high impedance to current flow through the second transistor between the afore-mentioned D.C. voltage levels. Second means are connected to the second transistor for biasing said second transistor for nonconduction under the control of said second transistor. That is, when the second transistor goes out of conduction, it causes the second means to bias it for nonconduction. This second means includes an arrangement whereby the bias may be overcome, this arrangement comprising a switch which receives a sync signal, which is delayed from the basic sync signal, and a voltage which is indicative of the fact that the second transistor is in a nonconductive condition. When the last-mentioned sync signal occurs, the bias on the second transistor is overcome by the output of the switch, and the second transistor is biased for conduction. Whether the second transistor can go into conduction depends on whether the next input signal to the first transistor has allowed the first means to bias the first transistor for conduction. In the event both the first and second transistors are biased for conduction, they both will go into conduction. The second means includes a driver which receives the output of the second transistor and inverts it to supply an output signal which will be delayed by approximately one-bit time from the input signal.

Accordingly, it is an object of the present invention to produce a new and improved signal translating apparatus.

Another object of the invention is to furnish a new and improved circuit for introducing a delay in the occurence of a signal.

Still another object of the present invention is to provide a new and improved circuit for entering an input signal into a bistable device.

Other objects of the invention will be pointed out in the following description and claims and illustrated in the accompanying drawings, which disclose, by way of examples, the principle of the invention and the best mode, which has been contemplated, of applying that principle.

Figure 1:
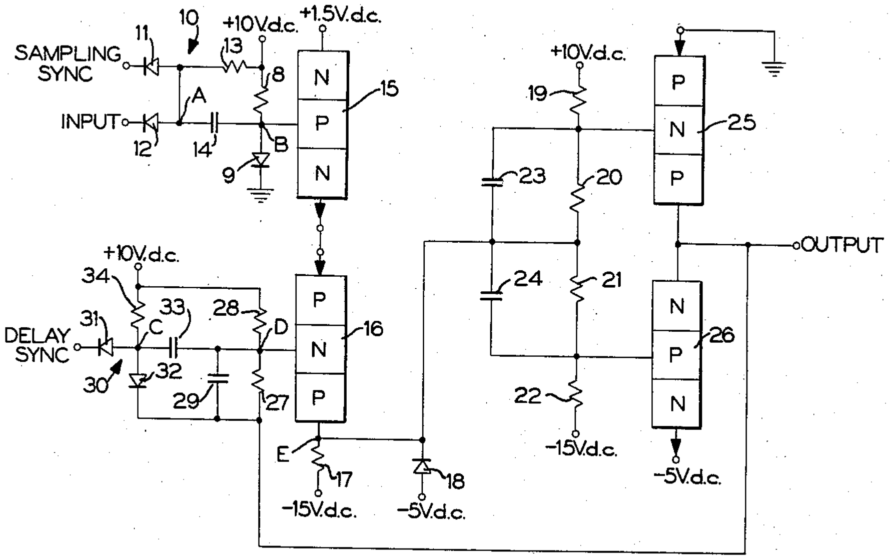
Fig. 1 is a schematic diagram of the present invention.
Figure 2:
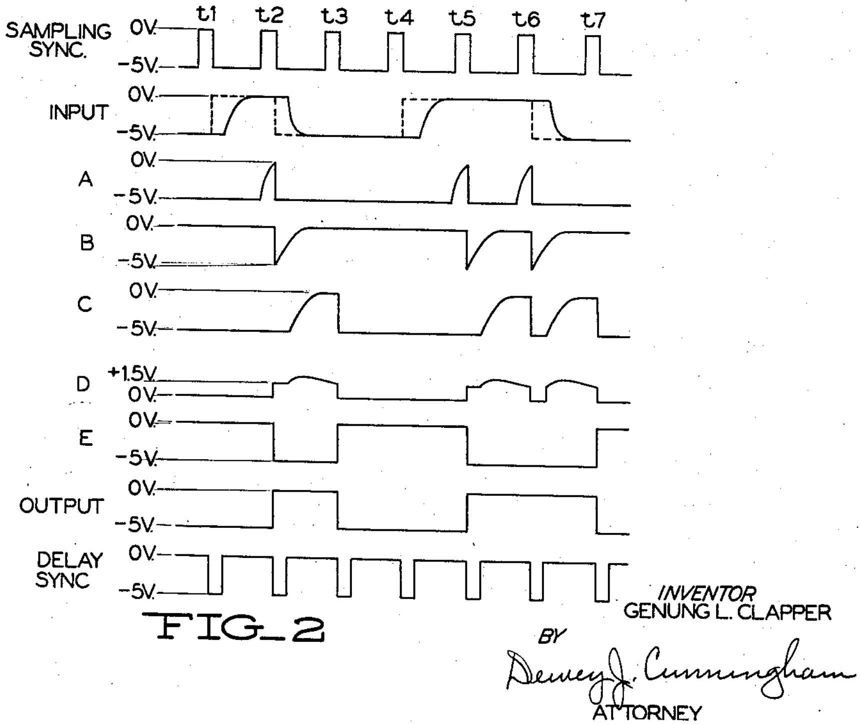
Fig. 2 shows a plurality of sample waveforms for different points in the circuit shown in Fig. 1.

Referring to Fig. 1, there is furnished a switch illustrated generally by reference numeral 10, this switch including diodes 11 and 12 and resistor 13. A Sampling Sync is adapted to be applied to the cathode of diode 11 while an Input signal is adapted to be supplied to the cathode of diode 12. As shown in Fig. 2, the Sampling Sync comprises a plurality of positive pulses which go from a first signal level to a second signal level and remain at the second signal level for a prescribed period of time and then return to the first signal level. The Input signal also goes between two levels, the first or lower level being termed the binary "0" level and the upper level being termed the binary "1" level. The dotted lines associated with the Input signal indicate its former condition before being delayed for some reason. Sampling occurs late in the Input signal so that accurate sampling is assured. During the intervals that there is a coincidence between the upper level of the Input signal and the Sampling Sync pulse, a relatively positive voltage will appear at point A as the output of the switch. This voltage is coupled by capacitor 14 to a point B which is connected to the base of an NPN junction type transistor 15. It will be noted that point B is connected intermediate a resistor 8 and the plate of a diode 9, the other end of the resistor being connected to a positive source of D.C. potential and the cathode of the diode being connected to ground. The arrangement is such that during the intervals that a relatively positive voltage is appearing at point A as the output of switch 10, capacitor 14 will be charged. This is due to the fact that diode 9 will be biased in its low resistance state. However, as soon as the Sampling Sync pulse ends, a negative going voltage will appear at point A and immediately produce a negative going voltage at point B, this voltage being illustrated in Fig. 2.

In the drawings of the transistors used in Fig. 1, the convention used is that the collector of an NPN transistor will always be shown connected to the upper N-type region while the emitter will be in the form of an arrow pointing away from the lower N-type region. For PNP transistors, the emitter will be in the form of an arrow pointing toward the upper P-type region and the collector will be connected to the lower P-type region. In both the NPN and PNP transistors, the base electrode will be connected to the center region of the transistor. Thus, in the NPN transistor, the base electrode is connected to the P-type region while in the PNP transistor the base electrode is connected to the N-type region.

Transistor 15 has its collector connected to a positive source of D.C. potential and its emitter connected to the emitter of a PNP junction type transistor 16, the collector of the last-mentioned transistor being connected by way of a resistor 17 to a negative source of D.C. potential. When transistor 15 is caused to go out of conduction, it will be seen that transistor 16 will also go out of conduction since transistor 15 will offer a high impedance to current flow from the positive source of D.C. potential connected to the collector of transistor 15 and the negative source of D.C. potential connected by way of resistor 17 to the collector of transistor 16. As transistor 16 goes out of conduction, the collector thereof begins to drop toward the negative source of D.C. potential connected thereto. This action is illustrated at point E in Fig. 2. However, a diode 18 is arranged with its cathode connected directly to the collector of transistor 16 and its plate connected to a negative source of D.C. potential which is somewhat more positive than the D.C. potential connected to the lower end of resistor 17. As soon as the collector of transistor 16 arrives at the level of the D.C. potential connected to the plate of diode 18, the collector cannot go any lower.

The output of the collector of transistor 16 is supplied to a complementary inverter driver which will now be described in detail. This driver comprises resistors 19, 20, 21 and 22, which are connected between two different levels of D.C. voltage. The upper end of resistor 19, as shown in the drawing, is connected to a positive source of D.C. potential, and the lower end of resistor 22, as shown in the drawings, is connected to a negative source of D.C. potential. Thus, these resistors form a voltage divider. The output from transistor 16 is taken from the collector thereof and supplied to a point intermediate resistors 20 and 21, there being high frequency by-pass capacitors 23 and 24 arranged in parallel with the resistors 20 and 21, respectively. A point intermediate resistors 19 and 20 is connected to the base of a PNP junction type transistor 25 and a point intermediate resistors 21 and 22 is connected to the base of an NPN junction type transistor 26. As shown, the emitter of transistor 25 is connected to ground while the emitter of transistor 26 is connected to a negative source of D.C. potential. The collectors of transistors 25 and 26 are connected together to form a common output for the driver.

The output of the collector of transistor 16, as shown at point E in Fig. 2, is at approximately ground potential during periods of conduction and at approximately −5 volts during periods of nonconduction. Thus, the input to the midpoint of the divider previously described is a voltage which may be either at ground level or −5 volts.

The operation of the driver circuit will now be described in detail. The value of resistor 19 is chosen such that it is several times larger than resistor 20. Also, resistor 22 is approximately equal in value to resistor 19 while resistor 21 is approximately equal to resistor 20. When the output from the collector of transistor 16 is at approximately ground potential, i.e. transistor 16 is not conducting, it will be seen that the base of PNP transistor 25 will be biased above ground sufficiently to prevent conduction of the transistor. However, the base of NPN transistor 26 will be sufficiently positive in relation to the emitter voltage thereof, to cause this transistor to conduct. The result is a relatively negative potential at the collector of transistor 26. When the collector voltage of transistor 16 is at approximately −5 volts, i.e. transistor 16 is not conducting, the base of the PNP transistor 25 will be sufficiently negative to allow the transistor to conduct, thereby resulting in the collector voltage of the transistor 25 being at approximately ground potential. On the other hand the base of the NPN transistor 26 will be more negative than the emitter thereof and will not allow transistor 26 to conduct. Thus, it will be seen that the output from the driver is an inversion of the output of the collector of transistor 16.

The commoned collectors of transistors 25 and 26 are connected to the lower end of a voltage divider which is comprised of resistors 27 and 28, the upper end of the divider being connected to a positive source of D.C. potential. The midpoint between resistors 27 and 28, which is labeled D, is connected to the base of transistor 16. When transistor 16 goes out of conduction and its collector drops to −5 volts, the output from the driver will be at ground potential which serves to raise the lower end of resistor 27. This results in a sufficiently positive voltage being applied to the base of transistor 16 to maintain it in a nonconductive state. In order that the base of transistor 16 may respond more readily to the output of the driver, a high frequency bypass capacitor 29 is arranged in parallel with the resistor 27.

In order to overcome the bias which is applied to the base of transistor 16 in the manner described above, there is provided a switch comprising diodes 31 and 32 and resistor 34. As is conventional in switches of this type, the plates are commoned and connected to one end of resistor 34, this commoned connection of the diodes being labeled C. The upper end of resistor 34 is connected to a positive source of D.C. potential. The cathode of diode 31 is adapted to have applied thereto a Delay Sync signal, the waveforms for this signal being shown in Fig. 2. The cathode of diode 32 is connected to the output of the driver previously described. During the intervals between the Delay Sync pulses, relatively positive voltages will be received by the cathode to diodes 31 and 32, assuming of course that transistor 16 is presently off so that the output from the driver will be at approximately ground potential. Since point D is already biased relatively positive, there is little action at point D as a result of a relatively positive voltage at point C, these points being coupled by capacitor 33. However capacitor 33 is allowed to charge to some extent as a result of the difference in potential between points C and D. As soon as the leading edge of the Delay Sync signal begins, point C drops sharply and results in a drop at point D, thereby biasing the transistor 16 for conduction. Whether transistor 16 will go into conduction depends on whether the base of transistor 15 is also biased for conduction. It will be seen that whether the base of transistor 15 is biased for conduction depends on whether there is the presence of a binary "1" in the Input signal at this time. In the event there is the presence of a binary "1," point B will have been dropped in potential at the same time that point D is lower in potential, thereby preventing both transistors from going into conduction. However, if there is the presence of a binary "0" in the Input signal, capacitor 14 will have been sufficiently discharged to allow point B to rise to a level sufficient to bias transistor 15 for conduction. As soon as point D rises sufficiently to bias transistor 16 for conduction, both of the transistors 15 and 16 will go into conduction.

The result of the circuit described in Fig. 1 is that the Output signal from the driver will be resynchronized with the Sampling Sync signal but the Output signal will be aproximately one-bit time delayed from the Input signal. For example, referring to Fig. 2, at time $t2$ there was a coincidence between the Sampling Sync signal and the Input signal, thereby resulting in capacitor 14 being charged, this charging action being afforded by the fact that diode 17 is forward biased at this time. However, as soon as the Sampling Sync signal at time $t2$ terminates, a negative going voltage appears at point B resulting in transistor 15 being turned off. This, of course, causes transistor 16 to also go out of conduction and results in a negative going voltage being supplied to the driver. Since the driver inverts the output of transistor 16, a positive going potential is supplied to the base of transistor 16 to bias transistor 16 for continued nonconduction. The output of the driver is also supplied to switch 30 and occurs there in coincidence with a relatively positive signal on the Delay Sync line. As shown at C in Fig. 2, the output of the switch will be a relatively positive voltage between Delay Sync pulses. This causes capacitor 33 to charge. When the Delay Sync pulse occurs and drives point C negatively, point D also drops to bias transistor 16 for conduction, this latter action occurring following the Sampling Sync pulse at time $t3$. Whether transistor 16 can go into conduction depends on whether transistor 15 is also biased for conduction. As shown, at time $t3$ there was not a coincidence between the Sampling Sync pulse and the Input signal. Thus, the base of transistor 15 is allowed to rise by the discharge of capacitor 14 and transistor 15 is biased for conduction. Since transistor 15 is biased for conduction prior to the time transistor 16 is biased for conduction, the bias of transistor 16 for conduction results in both transistors 15 and 16 being placed in conduction simultaneously.

When transistor 16 goes into conduction following time $t3$, a relatively positive output voltage from the collector thereof results in a relatively negative voltage as the output of the driver. This relatively negative voltage serves to bias transistor 16 for continued conduction. It is seen that at time $t4$ there is again a lack of coincidence between the Sampling Sync signal and the Input signal. Under these circumstances, transistor 15 will be allowed to contine conduction. At time $t5$, a coincidence occurs between the Sampling Sync pulse and the Input signal and results in transistor 15, as well as transistor 16, being turned off. As before, when transistor 16 goes off, a relatively positive voltage is applied thereof to the base thereof to bias it for non-conduction. At the same time a relatively positive voltage is applied from the driver to the cathode of diode 32. Between itnervals of the Delay Sync pulses, point C is allowed to rise and charge capacitor 33. When the Sampling Sync pulse comes along at time $t6$, there is again a coincidence therewith between this pulse and the Input signal, thereby causing point B to again drop and bias transistor 15 for nonconduction. Therefore, even though the Delay Sync pulse comes along following time $t6$ and drops the base of transistor 16 to bias the transistor for conduction, this transistor cannot go into conduction since transistor 15 is biased for nonconduction.

At time $t7$, there is not a coincidence between the Sampling Sync pulse and the input signal and transistor 15 is biased for conduction. During the Delay Sync pulse following time $t7$, the base of transistor 16 will be biased for conduction so that both transistors 15 and 16 are allowed to go into conduction.

It will be seen that I have provided a new and improved arrangement for introducing a delay in an input signal and resynchronizing the resulting output signal with the basic sync of the circuit. The arrangement is such that an envelope type output signal is produced, such an output signal being valuable in various circuit applications. While the transistor 16 and the driver comprising transistors 25 and 26 form one type of bistable device, it will be apparent that the driver could be replaced by a transistor which is cross-coupled with transistor 16 in a manner to form a bistable device.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Signal translating apparatus comprising first and second transistors each having a base, an emitter and a collector, the collector of said first transistor being connected to a first source of potential and the collector of said second transistor being connected through an impedance to a second source of potential, means connecting the emitters of said first and second transistors, the arrangement being such that the conduction of each transistor is dependent on the conduction of the other, a first input circuit connected to the base of said first transistor and a second input circuit connected to the base of said second transistor, said first input circuit biasing said first transistor for nonconduction in response to a first input signal, an output circuit connected to the collector of said second transistor, the output from said output circuit being connected to the base of said second transistor to bias said second transistor to remain in a nonconductive state when it is placed in such state as a result of said first transistor going into a nonconductive state, said second input circuit being responsive to a second input signal and said output signal for biasing said second transistor for conduction.

2. Signal translating apparatus comprising first and second transistors each having a base, an emitter and a collector, the collector of said first transistor being connected to a first source of potential and the collector of said second transistor being connected through an impedance to a second source of potential, means connecting the emitters of said first and second transistors, the arrangement being such that the conduction of each transistor is dependent on the conduction of the other, a first input circuit connected to the base of said first transistor and a second input circuit connected to the base of said second transistor, said first input circuit biasing said first transistor for nonconduction in response to a first input signal, an output circuit including inverter means connected to the collector of said second transistor for supplying an output signal to an output terminal, means connecting said output terminal to said second input circuit, said second input circuit being adapted to receive a series of periodic input signals, said second input circuit biasing said second transistor to remain in the same conductive state as said first transistor is in between said periodic signals and biasing said second transistor for conduction upon the occurrence of one of said periodic signals.

3. Signal translating apparatus comprising first and second transistors each having a base, an emitter and a collector, the collector of said first transistor being connected to a first source of potential and the collector of said second transistor being connected through an impedance to a second source of potential, means connecting the emitters of said first and second transistors, the arrangement being such that the conduction of each transistor is dependent on the conduction of the other, a first input circuit connected to the base of said first transistor and a second input circuit connected to the base of said second transistor, said first input circuit biasing said first transistor for nonconduction in response to a first input signal, an output circuit including inverter means connected to the collector of said second transistor, the output from said inverter means being connected to the base of said second transistor to bias said second transistor to remain in a nonconductive state when it is placed in such state as a result of said first transistor going into a nonconductive state, said second input circuit being responsive to a second input signal and said output signal for biasing said second transistor for conduction.

References Cited in the file of this patent

UNITED STATES PATENTS

| | | |
|---|---|---|
| 2,594,449 | Kircher | Apr. 29, 1952 |
| 2,627,039 | MacWilliams | Jan. 27, 1953 |
| 2,636,133 | Hussey | Apr. 21, 1953 |
| 2,644,893 | Gehman | July 7, 1953 |
| 2,651,728 | Wood | Sept. 8, 1953 |
| 2,760,087 | Felker | Aug. 21, 1956 |
| 2,764,688 | Grayson et al. | Sept. 25, 1956 |

FOREIGN PATENTS

| | | |
|---|---|---|
| 1,114,488 | France | Dec. 19, 1955 |
| 1,119,708 | France | Apr. 9, 1956 |